Patented Jan. 30, 1923.

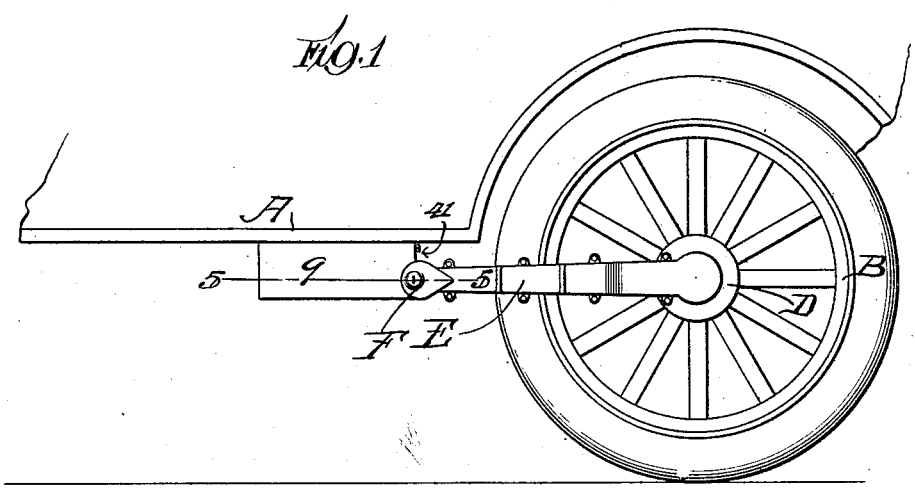

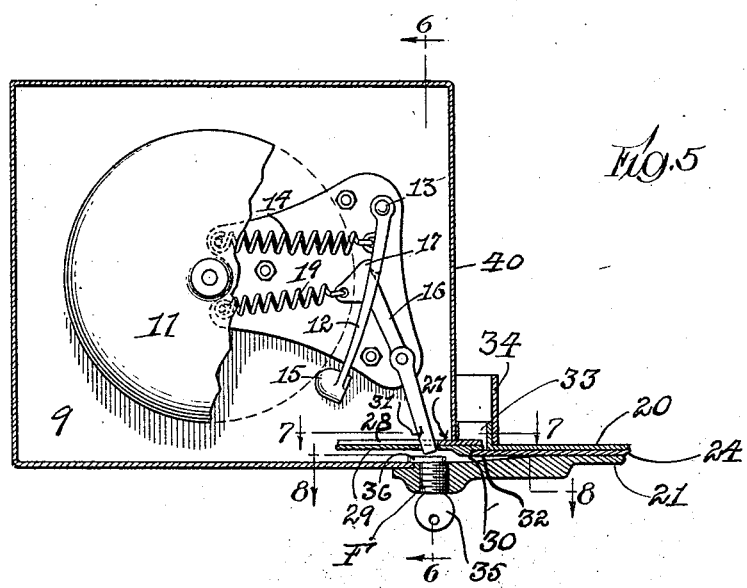
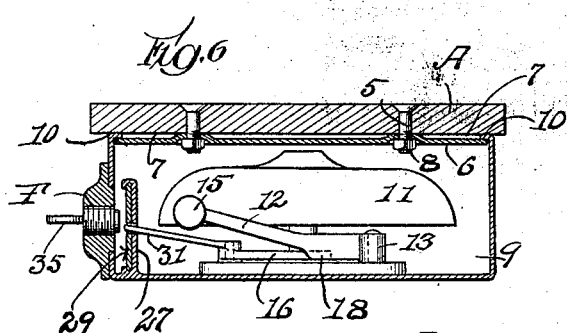
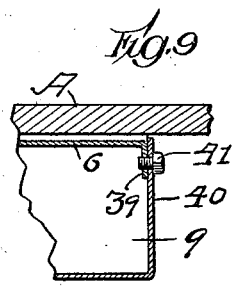
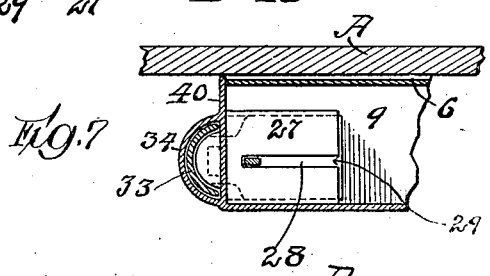
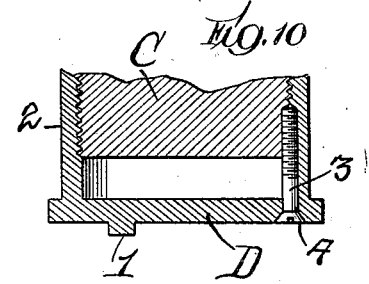
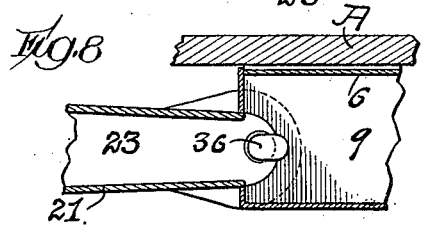

1,443,723

UNITED STATES PATENT OFFICE.

HAYDEN N. BELL, OF CHICAGO, ILLINOIS.

ALARM ATTACHMENT FOR VEHICLES.

Application filed February 7, 1921. Serial No. 443,246.

*To all whom it may concern:*

Be it known that I, HAYDEN N. BELL, a citizen of the United States, residing at Chicago, in the county of Cook and State of Illinois, have invented certain new and useful Improvements in Alarm Attachments for Vehicles, of which the following is a specification, reference being had to the accompanying drawings, and to the reference characters marked thereon, which form a part of this specification.

This invention relates to improvements in alarm actuating devices for automobiles and similar vehicles.
The object of the invention is to produce a device easy of application, simple in construction and efficient in use, whereby when applied to a vehicle and an attempt is made to move the car by one unauthorized to handle it, an alarm will automatically sound and will continue to sound so long as the car is being moved, thus giving public notice that the car is being stolen, and either frightening away the thief or making his arrest more easy, or both.

The invention comprehends, in general terms, an encased alarm bell, a rotatable crank on the rear axle wheel hub, a removable reciprocating member operatively connected with the crank at one end and with the bell at its other end, and key operated means for locking the reciprocating member to the car after being positioned for its intended use, as by the car owner when he is about to leave the car for the night in the garage, or when parking it during the day.

The invention consists in the devices and combination of devices herein illustrated and described, and more particularly set forth in the appended claims. It will be manifest, as I proceed with my specification, that modifications may be made in the details of construction without departing from the principle of the invention, and, therefore, I would have it understood that my invention is not limited as to form or other details shown or described, except as set forth in said claims.

In that form of device in which I have chosen to illustrate my invention:

Fig. 1 is a side elevation of a portion of a vehicle embracing the rear wheel, to which my alarm device is applied.

Fig. 2 is a side elevation of the inside of a removable lock arm.

Fig. 3 is a horizontal, longitudinal sectional view of the lock arm, taken in the plane indicated by the dotted lines 3—3 of Fig. 4.

Fig. 4 is a side elevation of the outside of the lock arm.

Fig. 5 is a horizontal, sectional view, enlarged, of a portion of the device showing the alarm mechanism, the same being taken upon the plane of the line 5—5 of Fig. 1.

Fig. 6 is a transverse, vertical, sectional view of the same, taken upon the plane of the line 6—6 of Fig. 5, looking in the direction indicated by the arrows.

Fig. 7 is a vertical sectional view of a portion of the device, taken upon the plane of the line 7—7 of Fig. 5, looking in the direction indicated by the arrows.

Fig. 8 is a similar view, taken upon the plane of the line 8—8 of Fig. 5, looking in the direction indicated by the arrows.

Fig. 9 is a vertical, sectional view of a detail of the housing construction.

Fig. 10 is a horizontal, sectional view, enlarged, taken through the hub cap plate.

In said drawings, A represents a fixed support, as for example the running board of an automobile, and B one of the rear wheels, having a hub cap C. To the latter I secure, by any suitable means, a plate D provided with a projecting stud 1. This stud is set eccentrically of the axis of the wheel, as will be understood. The particular manner of securing the plate D, illustrated in Fig. 10, is recommended, the same comprising a tubular interiorly threaded body 2, integral with the plate D, and fitting over the cap C. A locking bolt 3 engages both the plate and the cup, its head 4 being counter-sunk in the face of the plate D.

To the support A, I secure by suitable bolts 5, a plate 6, having its two side margins bent to form guide ways 7 extending longitudinally of the car. The bolts 5 are let in from the opposite side of the support A with their heads counter-sunk as shown, and the nuts 8 upon the under side of the plate 6. To this plate 6, I secure a metal housing or box 9, the upper margins of its two sides being turned inwardly to form flanges 10, adapted to engage and be finally held in the guides 7. Within the housing 9 I place a bell 11, and a bell sounding hammer arm 12. This arm is adapted to be rocked about a pivotal support 13. A heavy spring 14 secured at one end to the housing 9 and at its other end to the arm 12, exerts a firm tension upon the arm, so as to cause the hammer 15 to strike the bell 11 with a heavy blow when the arm 12 is tripped or released. 16 is a pivoted trip arm having a detent or lug 17, adapted to engage the lug 18 on the arm 12. A spring 19 exerts tension on the arm 16 as shown.

E is a removable lock arm usually carried in the vehicle and adapted to be placed in the operative position shown in Fig. 1, when occasion requires, with one of its ends over the plate D, and its other end inserted in and locked to the housing 9. F is a suitable key-operated locking device, in the forward end of the arm E. As shown in the drawings, the arm E is composed of two members 20 and 21, firmly bolted or otherwise secured together, as indicated at 22. The proximate face of one or both of the members 20, 21, is grooved longitudinally of its length to form a recess 23 to hold a trip bar 24. At the rear end 25 of this bar, I provide a transverse slot 26 of a width equal to the diameter of the stud 1. The side walls of this slot 26 thus embrace the stud and it follows that as the wheel B revolves, the stud 1 will rotate and push the bar 24 forward and backward, within the recess 23 and longitudinally thereof, as the stud slides up and down in the slot 26.

Adjacent to the opening in that corner of the housing 9 where the forward end of the lock arm E enters the housing, I provide a vertical partition or wall 27, having a suitable recess or slot 28, horizontally disposed as shown in Fig. 7. As illustrated, this partition 27 is integral with the bottom of the housing 9, but manifestly same may be secured in any suitable manner to the housing. The lower and upper portions of the partition 27 are shaped to form a groove or guide-way for a reciprocating plate 29 having a shoulder 30. The end 31 of the trip arm 16 is engaged with the plate 29, the end of the arm passing through the slot 28. The inner end 32 of the trip bar 24 rests against the shoulder 30 of the plate 29. The spring 19 holds the trip arm 16 normally in the position shown in Fig. 5, and insures its return to that position after each forward reciprocation of the trip arm 24 and plate 29.

The forward end of the member 20 of the two-part arm E is provided with a semi-circular flange member 33, which slips into the space formed by the extension 34 on the rear wall of the housing 9. This connection is made by a sidewise or bodily movement of the arm E toward the housing 9 and thus it will be understood that when the flange 33 engages the extension 34 of the housing, a disengagement of the parts by a straight, longitudinal or rearward movement of the arm E can not occur.

In the forward end of the member 21 of the two-part arm E, is a suitable key-controlled lock. This is shown in the drawing as being controlled by a key 35 actuating a locking bolt 36. The locking bolt 36 enters the aperture in the housing 9 and engages the rear end margin of the side wall of the housing, as clearly shown in Fig. 5 in full lines, and as shown in Fig. 3 in dotted lines. Thus a disengagement of the two part arm E from the housing by a bodily outward movement of the arm E cannot occur, so long as the bolt in the lock has been thrown, and can only occur when the bolt is turned by the proper movement of the key. Moreover, the arm E may not be pried loose by forward pressure exerted upon the rear end of the device in a direction away from the axle, for the reason that the engagement upon the hub cap together with the engagement of the front end with the housing, and particularly the engagement of the flange 33 with the extension 34 will be of such depth as to render any disengagement of the parts, except by a straight side-wise movement, clearly impossible; and, as before stated, the side-wise movement of the arm E, cannot occur when the arm is locked to the housing.

I have shown the two members 20, 21, of the arm E, as secured together by bolts or rivets 22, but manifestly it will be understood that any other means may be employed for this purpose. To add strength and stiffness to the arm E, one of the members 20, for example, is provided with a longitudinal strengthening rib 37, and the other member is provided with one or more transversely arranged ribs 38.

The plate 6 may be locked to the housing after the latter has been put in position, by any convenient means. A simple arrangement will be that shown in Fig. 9, comprising a downwardly projecting flange 39, and a suitable aperture in the rear wall, 40, of the housing 9, the flange and the wall being secured together by an ordinary bolt 41.

The operation of the device will be manifest from the foregoing description of the parts, and it will be clear therefrom that the user of the machine only has to bodily place the arm E sidewise up against the machine, fitting one end over the cap plate D and the other end against the frame of the housing 9, and by turning the key in the lock F, he secures the parts together. Therefore, when the car is moved sufficiently to cause a rotation of the wheel B, it follows that the pin or stub 1 entering the slot 26 of the reciprocating trip arm 24, said arm will be moved forward and then back longitudinally, as long as the wheel is being rotated, and with each rotation of the wheel, the plate 29 moves the trip arm 16 which pulls the hammer arm 12 against the tension of the spring 14 in a direction away from the bell 11 until the shoulder 17 disengages itself from the arm 12, whereupon the spring 14 will cause the arm 12 to move rapidly and with considerable force in the opposite direction, until its hammer 15 strikes the bell 11, thus sounding the alarm. The more rapidly the vehicle is moved, the more rapid will be these movements just described, with the result of a constantly ringing alarm bell.

The placing of the arm E and locking it to the vehicle, is but the work of a moment, and the removal of the same requires merely the turning of the key in the lock F.

One of the principal uses for this device will be found in populous districts where cars are permitted to be parked, inasmuch as the movement of the vehicle, with the arm E locked in position, will sound the alarm so constantly as to attract the attention and advertise the fact that the car is being unauthorizedly handled. The invention will also be of great advantage when used on cars placed in public garages, for manifestly, it will prevent any unauthorized use of the car, since it cannot be moved without ringing the alarm.

I claim as my invention:

1. An alarm attachment for vehicles comprising a rotatable element and a support fixed with relation to the rotatable element, an alarm sounding element secured to the fixed support and a removable operating element adapted, when attached in position on the fixed support, for operative connection with the rotatable element and with the alarm sounding element and means for locking the removable element.

2. An alarm attachment for vehicles comprising a rotatable element and a support fixed with relation to said element, an alarm sounding element secured to the fixed support, a removable reciprocating element adapted for operative connection with the rotatable element and with the alarm sounding element, and means for locking the removable element to the support.

3. An alarm attachment for vehicles comprising a rotating element and a fixed support, an alarm sounding element on the fixed support, an eccentrically mounted operating pin on the rotating element, a removable connecting arm, a reciprocating actuating arm associated therewith, said reciprocating arm being adapted for operative connection at one end with said eccentric pin and at its other end with said arm sounding mechanism.

4. In a device of the character described, a fixed support, a housing thereon, a bell within the housing, mechanism for ringing the bell, an operating pin eccentrically mounted on the vehicle wheel hub, and a reciprocating member operatively connected at its ends to said bell ringing device and said eccentric pin.

5. In a device of the character described, a fixed support, a housing thereon, a bell within the housing, mechanism for ringing the bell, an operating pin eccentrically mounted on the vehicle wheel hub, and a removable reciprocating element operatively connected at one end to said bell ringing mechanism, its other end covering and operatively connected to said eccentric pin.

6. In a device of the character described, the combination with a fixed support and a rotatable element, of a housing, an alarm mechanism within the housing, a trip arm within the housing for actuating said alarm element, a plate slidably mounted in the housing and operatively connected with the trip arm and means for actuating said plate, said means comprising a removable reciprocating member secured at one end to the support and operatively connected at its other end to the rotatable element.

7. The combination with a fixed support, a guide plate secured beneath the same, a housing slidably mounted on said guide plate, and means for securing one wall of the housing to said guide plate, an alarm mechanism within said housing, a rotating element provided with an eccentrically mounted pin thereon, a removable lock arm provided with an actuating reciprocating member, connected at its forward end to said housing, means for attaching the other end of the arm to the rotating member, means for connecting one end of the actuating member to said eccentric pin, and operative means connecting the other end of the reciprocating member with said alarm mechanism.

8. The combination with a fixed support, a guide plate secured beneath the same, a housing slidably mounted on said guide plate, and means for securing one wall of the housing to said guide plate, an alarm mechanism within said housing, a rotating element provided with an eccentrically mounted pin thereon, a removable lock arm, an actuating member slidingly supported in said arm, means for attaching one end of the arm to the rotating member, means for connecting the actuating member to said eccentric pin, means for locking the other end of said arm to the housing and operative means connecting one end of the reciprocating member with said alarm mechanism.

9. In a device of the character described, a fixed support, a rotatable wheel associated therewith, a cap plate secured to the wheel hub, a pin ecentrically mounted on said plate, a lock arm provided for removable attachment at one end to said plate, and at its other end for removable attachment to said housing, a key operated bolt for locking said arm to said housing, a longitudinal reciprocating member in said arm, provided at one end with a slot adapted for engagement with said eccentrically mounted pin and having operative engagement at its other end with the arm mechanism in the housing.

10. In a device of the character described comprising a fixed alarm mechansm, an operating pin rotatably mounted on a vehicle wheel hub, and a two part removable arm, one member whereof is provided at one end with a circular flange, the other end being adapted at one end to fit over a wheel hub and at its other end adapted to hold a key operated lock, means for securing the two members together, an operating arm movable with respect to and secured within said two part arm, strengthening ribs on said arm members, and means on said removable arm for operatively connecting it with the rotatable pin and with the alarm mechanism.

11. An alarm attachment for vehicles comprising a rotating element on the hub of a wheel of the vehicle, and a fixed support, an alarm sounding element on the fixed support, operating means on the rotating element for transmitting motion thereof, a removable connecting arm, a reciprocating actuating arm associated therewith, said reciprocating arm being adapted for operative connection at one end with said operating means on the rotating element and at its other end with said alarm sounding mechanism, and means for locking said removable connecting arm in operative position.

12. In an alarm attachment for vehicles, the combination with a fixed support, a guide plate secured beneath the same, a housing slidably mounted on said guide plate and means for securing one wall of the housing to said guide plate, an alarm mechanism within said housing, a rotating element on the hub of the wheel provided with means for transmitting the motion thereof, a removable lock arm provided with an actuating reciprocating member connected at one end to the said housing, means for attaching the other end of the arm to the rotating member, means for connecting one end of the actuating member to said operating means on the rotating element, and operative means connecting the other end of the reciprocating member with said alarm mechanism, and means for locking said removable connecting arm in operative position.

In testimony that I claim the foregoing as my invention I affix my signature in the presence of two witnesses, this 4th day of February, 1921.

HAYDEN N. BELL.

Witnesses:
TAYLOR E. BROWN,
B. L. MACGREGOR.